Patented Nov. 14, 1922.

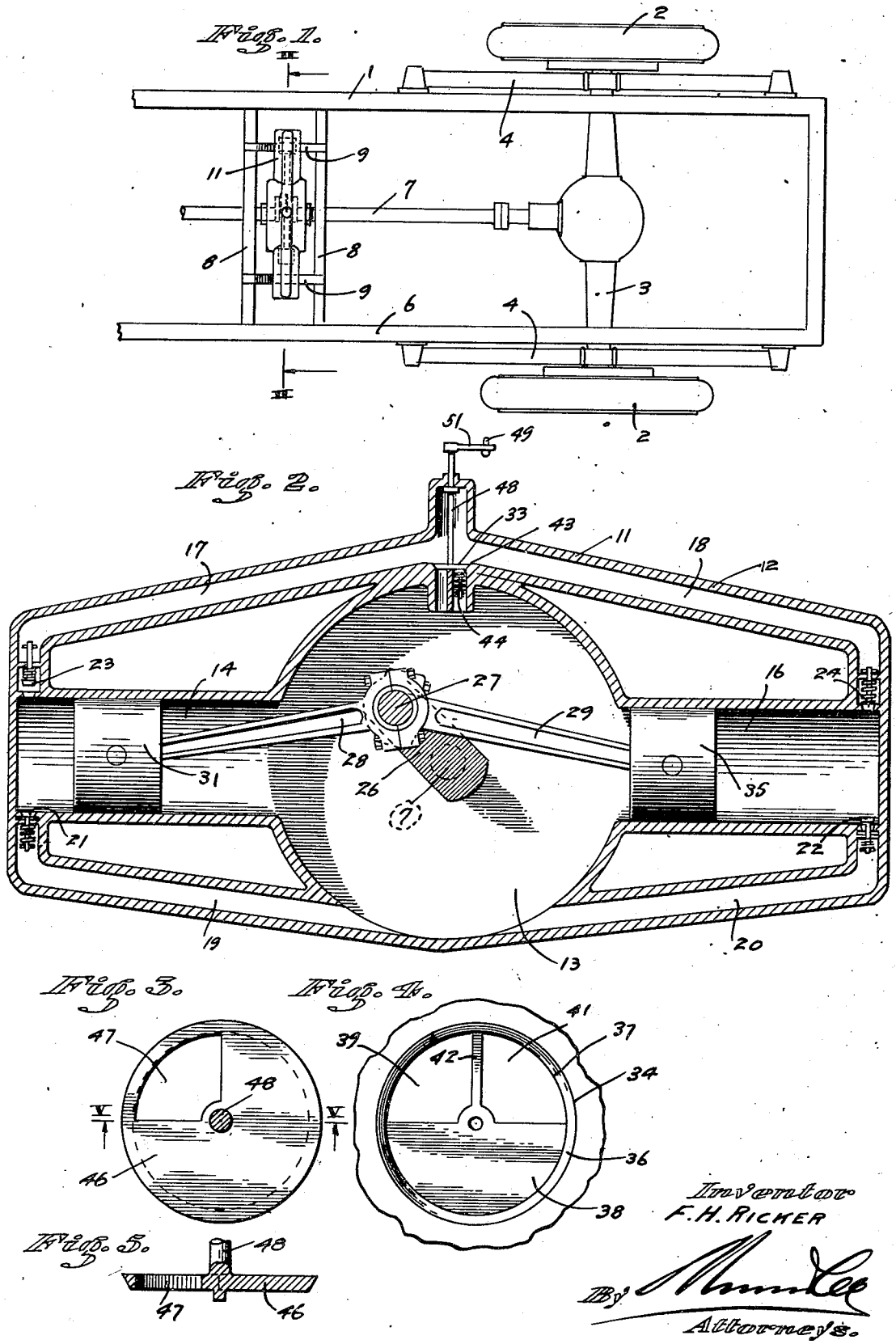

1,435,499

UNITED STATES PATENT OFFICE.

FLOYD H. RICKER, OF LOS ANGELES, CALIFORNIA.

BRAKE FOR SELF-PROPELLING VEHICLES.

Application filed January 17, 1922. Serial No. 529,877.

*To all whom it may concern:*

Be it known that I, FLOYD H. RICKER, a citizen of the United States, resident of Los Angeles, county of Los Angeles, and State of California, have invented a new and useful Brake for Self-Propelling Vehicles, of which the following is a specification.

The present invention relates to improvements in brakes for rotating shafts generally and has more particular reference to a brake for a self-propelling vehicle. Briefly stated the object of the present invention is to connect the main drive shaft of a motor vehicle with a circulation system so that the shaft drives a pump causing a medium to circulate in the system and to provide suitable means within the system for stopping the circulation, whereby the pump as well as the shaft is rendered inactive. A further object of my invention is to provide a specially designed valve for the purpose of rendering the obstacle in the circulation system variable.

With these and other objects in view I have illustrated the preferred form of my invention in the accompanying drawing in which Figure 1 is a top plan view, in general outlines, of the chassis of a motor vehicle having my device attached thereto, Figure 2 a longitudinal vertical cross-section through my device along line 2—2 of Figure 1, Figure 3 a detail view of a valve used in my device, Figure 4 a detail view of a valve seat co-operating with the valve illustrated in Figure 3 and Figure 5 a vertical cross-section through the valve along line 5—5 of Figure 3. While I have shown only the preferred form of my invention I wish to have it understood that various changes and modifications may be made within the scope of the claims hereto attached without departing from the spirit of the invention.

In Figure 1 is shown the rear portion of the chassis (1) of a motor vehicle comprising the two wheels (2), the rear axle housing (3), the rear springs (4), the frame (6) and the main drive shaft (7). The frame is provided intermediate of its length with two transverse supporting members (8) having two longitudinal members (9) secured thereto on which my brake (11) is supported. The latter is shown in detail in Figure 2 and may be described as substantially embodying the principles of a double acting force pump. It comprises a housing (12) arranged symmetrically around the shaft (7) containing a central crank case (13), two cylinders (14) and (16) extending from the crank case in opposite direction in the plane of the shaft (7), and return passages (17), (18), (19) and (20) leading from the extreme ends of the cylinders (14) and (16) back to the crank case. The communications between the passages (17), (18), (19) and (20) and the two cylinders are controlled by the two suction valves (21) and (22) and the two delivery valves (23) and (24). The main drive shaft (7) is broken so as to receive the two cranks (26) supporting the pin (27) which latter engages the inner ends of two pistons rods (28) and (29) to the outer ends of which are pivotally secured two pistons (31) and (35) adapted to reciprocate within the cylinders (14) and (16) respectively.

The communication between the passages (17) and (18) and the crank case is controlled by a valve (33). The seat (34) for this valve is shown in detail in Figure 4 and comprises a conical rim (36) which is partly closed by means of a disk (38). This disk has two adjacent sectors (39) and (41) cut out of the same, the two being separated by a web (42). One of these sectors (41) is controlled by a valve (43) which normally closes the same under the influence of a spring (44) but which yields when sufficient pressure is brought to bear on it. The valve (33), which is shown in detail in Figure 3, comprises a disk (46) having one sector (47) corresponding in size to the sectors (39) and (41) cut out of the same and a valve stem (48) actuated from the driver's seat by means of a connecting rod (49) engaging a handle (51). In this manner the disk (46) constituting the valve can be revolved over the valve seat so that its open sector (47) selectively registers either with the open sector (39) of the valve seat or with the valve controlled sector (41) of the valve seat or with the solid portion (38) of the same. It will be readily seen that when the sector (47) of the valve registers with the sector (39) of the valve seat practically no obstruction is offered to the free circulation of the medium selected, such as oil or water or air, under the influence of the reciprocating piston. But when the valve is revolved so that the sector (47) registers with the sector (41) of the valve seat considerable obstruction is offered to the flow of the circulating medium and this obstruction will tend to retard the rotation of the shaft (7) since it requires more work to force the circulating medium through the valve (43). If the valve (33) is revolved still further the open sector (47) will register with the solid portion (38) of the valve seat and stop the flow of the circulating medium altogether, whereby the shaft (7) will be stopped almost immediately if a liquid is selected as a circulating medium and somewhat more slowly if a gas is used.

The operation of my device will be readily understood from the foregoing description. The rotation of the shaft (7) causes the two pistons (31) and (32) to reciprocate in their respective cylinders, sucking on their inward stroke a portion of the circulating medium into the cylinders through the valves (21) or (22) and forcing the same into the passages (17) or (18) through the valves (23) or (24) on their outward strokes. As long as the valve (33) is opened very little resistance is offered to the flow of the circulating medium so that the same will return through the crank case into the passages (19) and (20). When however the valve (33) is closed the circulating medium is prevented from flowing and the pistons (31) and (32) will naturally come to a stand still since the passages (17) and (18) are filled up.

The particular valve construction selected for my device allows of an unlimited number of variations since there are many intermediate positions possible beside the three positions described and each position offers a different resistance to the flow of the circulating medium.

I claim:

1. In combination with a rotating shaft, a brake comprising a circulating pump adapted to be actuated by the shaft and means for obstructing the circulation whereby the pump and the shaft are rendered inactive, said means comprising a valve having a variable resistance associated therewith.

2. In combination with a rotating shaft, a brake comprising a circulating pump adapted to be actuated by the shaft and means for obstructing the circulation whereby the pump and the shaft are rendered inactive, said means comprising a disc-shaped valve having a seat providing two adjacent open sectors, a yielding valve controlling one of the sectors, and an open sector in the disc-shaped valve adapted to be revolved over the valve seat.

FLOYD H. RICKER.